Patented June 11, 1929.

1,717,171

UNITED STATES PATENT OFFICE.

ARLIE W. SCHORGER, OF MADISON, WISCONSIN, ASSIGNOR, BY MESNE ASSIGNMENTS, TO BURGESS BATTERY CO., OF MADISON, WISCONSIN, A CORPORATION OF WISCONSIN.

PLASTIC CONDUCTIVE COMPOSITION.

No Drawing. Application filed August 12, 1927. Serial No. 212,612.

This invention relates to an improvement in plastic conductive compositions.

It is the object of this invention to provide a plastic conductive composition which has properties that make it superior for dry cell purposes over those compositions heretofore used.

In the manufacture of dry cells, and especially flat dry cells, it usually becomes necessary to provide a plastic conductive mixture which is used to cover a flat metal base which acts as a conductive reenforcing member and prevents distortion of the plastic composition. In other types of cells the base may be in the form of a rod, cup, or other peculiar shape, as may be called for in the cell design. This plastic conductive mixture, which usually contains carbon or graphite as the conductive agent, also forms the cathode of the cell. If the dry cell is of the Leclanché type, the plastic composition is the cathode and must protect the metal base from the destructive action of the sal ammoniac and zinc chloride which constitute the dry cell electrolyte. The plastic conductive composition must necessarily have a low resistance, necessitating a thin coating over the metal base and also a high percentage of graphite or carbon.

Heretofore graphite filled plastic conductive compositions have contained various percentages of oils, rosin, varnishes, beeswax, paraffin, alone or in various combinations. A typical composition contains graphite, rosin, paraffin, and linseed oil. This mixture is soft when heated so that it may be hot rolled into sheets or rods, or it may be applied to a metal base, such as sheet zinc. When cold the mixture does not flow. Such a composition, when used in contact with a dry cell depolarizing mix containing sal ammoniac or zinc chloride, has several defects which I have overcome by substituting commercial Montan wax for the paraffin.

Montan wax is a true wax obtained from the brown coals of Germany. I have found that the Montan wax gives a better amalgamation with the rest of the ingredients, raises the softening point, and gives a tougher composition. This results in a greater mechanical resistance to penetration by the depolarizing mix. Furthermore the resulting plastic conductive composition shows a high resistance to the penetrative action of the depolarizing mix especially during the warm summer weather. A plastic conductive composition containing Montan wax in place of the paraffin shows little or no pitting when in contact with the depolarizing mix and as a result a much thinner coat may be used.

My preferred composition follows: rosin, 30 percent; raw linseed oil, 5 percent; Montan wax, 5 percent; powdered graphite, 60 percent. The graphite consists of equal parts of graphite passing a 200 mesh screen and graphite passing a 20 mesh screen. The rosin, oil and wax are melted together by heat to form a liquid after which the graphite is stirred in while still hot until a homogeneous plastic mass is formed. The composition is then rolled out or applied to the metal surface while still hot.

I claim:

1. A plastic conductive composition comprising graphite, rosin, Montan wax and linseed oil.

2. A plastic conductive composition comprising about 60 parts of graphite, 30 parts of rosin, 5 parts Montan wax and 5 parts linseed oil.

In testimony whereof I affix my signature.

ARLIE W. SCHORGER.